US005592359A

United States Patent [19]

Kompanek

[11] Patent Number: 5,592,359

[45] Date of Patent: Jan. 7, 1997

[54] TRANSDUCER

[75] Inventor: Harry W. Kompanek, Santa Barbara, Calif.

[73] Assignee: Undersea Transducer Technology, Inc., Ventura, Calif.

[21] Appl. No.: 275,941

[22] Filed: Jul. 13, 1994

[51] Int. Cl.[6] .............................. H01G 4/38; G01M 7/00

[52] U.S. Cl. .............................. 361/329; 73/662

[58] Field of Search .............................. 361/328–330, 361/522, 541, 280, 281; 310/314, 316–319, 367, 369; 73/718, 724, 662, 664, 668

[56] References Cited

U.S. PATENT DOCUMENTS

| | | | |
|---|---|---|---|
| 3,832,580 | 8/1974 | Yamamuro et al. . | |
| 3,937,991 | 2/1976 | Massa et al. . | |
| 4,307,434 | 12/1981 | Holtzman | 361/328 |
| 4,384,263 | 5/1983 | Neuman et al. | 361/329 |
| 4,447,854 | 5/1984 | Markarian | 361/329 |
| 4,751,418 | 6/1988 | Murase | 310/319 |

*Primary Examiner*—Bot L. Ledynh
*Attorney, Agent, or Firm*—Ellsworth R. Roston; Charles H. Schwartz

[57] ABSTRACT

First and second units have similar, preferably substantially identical, constructions. Each unit is preferably cylindrical and has an outer electrically conductive shell preferably made from a metal. A dielectric material, preferably a ceramic, abuts the inner surface of the electrically conductive shell in each unit. A conductive coating is disposed on the inner surface of the dielectric material in each unit. In this way, each unit defines a capacitor with the shell and the conductive coating constituting the capacitor plates. The shell and the dielectric material in each unit have axially extending openings of matching dispositions. The units are disposed in abutting relationship with the openings facing each other. An alternating voltage is applied between the conductive coating and the conductive shell in each unit. This causes current to flow through the capacitor in each unit and to produce vibrations of the shell and the dielectric material in each unit. Because of the bracing provided by the bonding of the two (2) units, the units are inhibited from breaking as a result of the vibrations. Furthermore, the units are able to respond to voltages of increased amplitude, thereby increasing the intensity of the vibrations. The bonding of the units also inhibits vibrations of the units in undesirable directions and concentrates the vibrations in a particular direction providing optimal benefits.

37 Claims, 1 Drawing Sheet

TRANSDUCER

Figure 2:
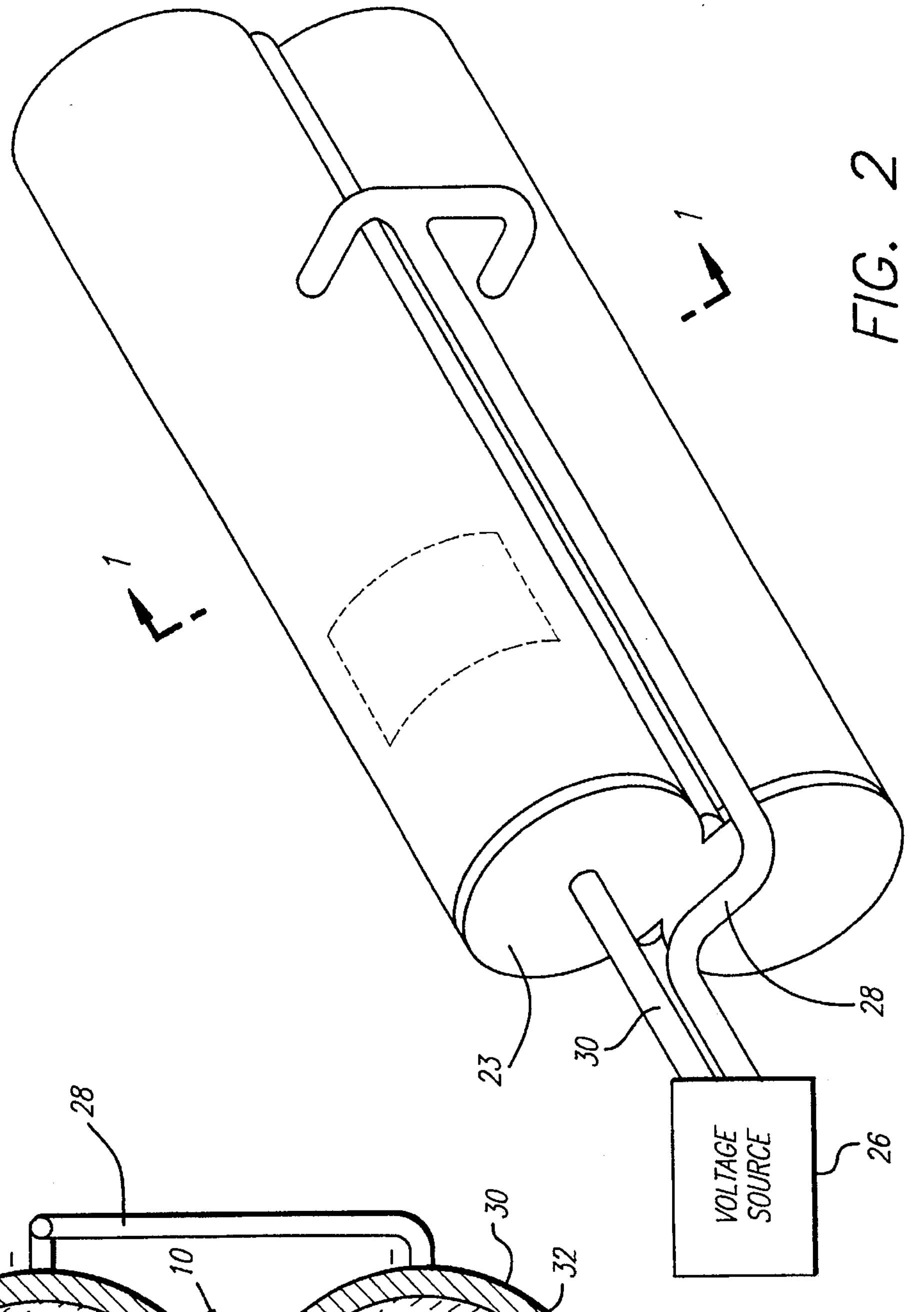

This invention relates to transducers and more particularly to transducers which are vibrated to release fluids in the area around the transducers. More particularly, the invention relates to transducers which provide increased power and increased factors of safe operation relative to the transducers of the prior art.

Oil is often disposed below the ground in sedimentation which makes it difficult for the oil to be separated and recovered from the sedimentation. Transducers are often used to separate the oil from the sedimentation and recover the separated oil. The transducers are vibrated to shake the area around the transducers. The shaking causes the oil to be separated from the sedimentation, thereby facilitating the recovery of the separated oil. Transducers are also often used to separate water from the sedimentation and recover the separated water in the same manner as discussed above for oil.

The transducers are often provided with a cylindrical configuration open at one end to have a C-shaped configuration in section. The transducers are defined by an outer electrically conductive shell, a dielectric material (e.g. a ceramic) within the shell in abutting relationship to the shell and an electrically conductive coating on the inner surface of the dielectric material. When an alternating voltage is applied between the conductive shell and the conductive coating, the resultant flow of current between the shell and the coating produces a vibration of the dielectric material and the shell. The vibration releases the fluid such as oil from the sedimentation in which the oil is trapped so that the released fluid can be relatively easily recovered.

The transducers now in use have certain significant disadvantages. The transducers tend to crack and break from the strains imposed on the transducers by the vibration of the transducers. When the transducers crack or break, they can no longer vibrate and separate fluids such as oil from the sedimentation and recover the separated oil. In order to prevent the transducers from cracking or breaking, the power applied to the transducers has been somewhat limited. This has considerably impaired the ability of the transducers to vibrate with a significant amplitude to separate the fluid such as oil from the sedimentation and to recover the oil. The disadvantages and limitations discussed in this paragraph have been known for some time. Considerable efforts have been made to alleviate such problems but such efforts have not been successful.

This invention provides a transducer assembly which overcomes the problems discussed in the previous paragraph. The invention provides a transducer assembly which includes a pair of transducers and which provides increased amounts of power relative to the transducers of the prior art without cracking or breaking. The transducer assembly of this invention also produces vibrations in a direction providing an optimal effect in separating the fluid such as oil from the sedimentation and in recovering the separated oil.

In one embodiment of the invention, first and second units have similar, preferably substantially identical, constructions. Each unit is preferably cylindrical and has an outer electrically conductive shell preferably made from a metal. A dielectric material, preferably a ceramic, abuts the inner surface of the electrically conductive shell in each unit. A conductive coating is disposed on the inner surface of the dielectric material in each unit. In this way, each unit defines a capacitor with the shell and the conductive coating constituting the capacitor plates. The shell and the dielectric material in each unit have axially extending openings of matching dispositions. The units are disposed in abutting relationship with the openings facing each other.

An alternating voltage is applied between the conductive coating and the conductive shell in each unit. This causes current to flow through the capacitor in each unit and to produce vibrations of the shell and the dielectric material in each unit. Because of the bracing provided by the bonding of the two (2) units, the units are inhibited from breaking as a result of the vibrations. Furthermore, the units are able to respond to voltages of increased amplitude, thereby increasing the intensity of the vibrations. The bonding of the units also inhibits vibrations of the units in undesirable directions and concentrates the vibrations in a particular direction providing optimal benefits.

Figure 1:
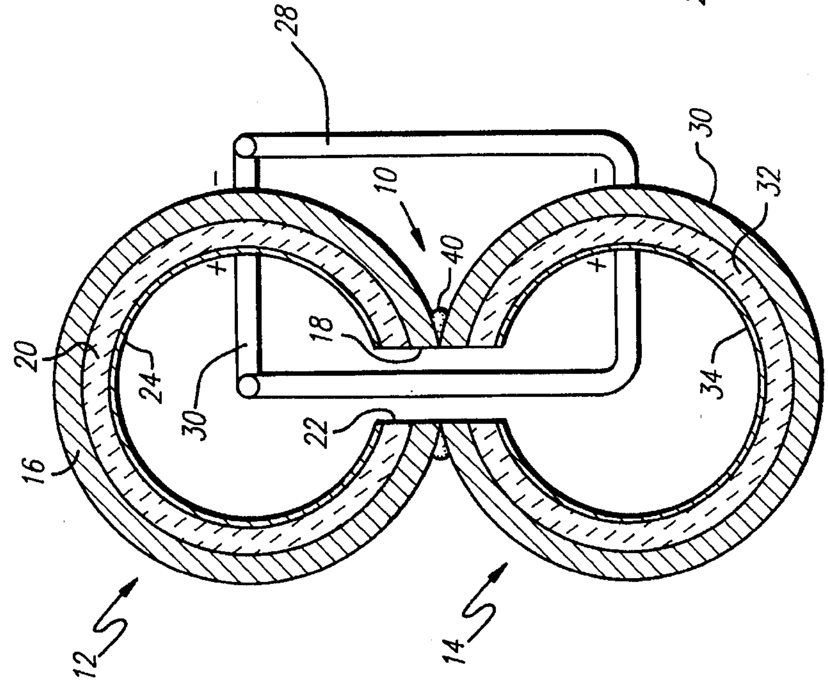

In the drawings:

FIG. 1 is a sectional view of a transducer assembly constituting one embodiment of the invention and is taken substantially on the line 1—1 of FIG. 2; and FIG. 2 is a schematic perspective view of the transducer assembly shown in FIG. 1.

FIGS. 1 and 2 illustrate a transducer assembly generally indicated at 10 and constituting one embodiment of the invention. The transducer assembly 10 includes a pair of transducer units generally indicated at 12 and 14. The transducer units 12 and 14 may have a similar construction but preferably have a substantially identical construction.

The transducer 12 includes a shell 16 having electrically conductive properties. Preferably the shell 16 is metallic and is made from a suitable material such as aluminum or steel. The shell 16 may also be made from a composite material. The shell 16 is preferably cylindrical and has an opening 18 extending axially at one end.

A member 20, preferably cylindrical, is disposed within the shell 16 in abutting relationship with the inner surface of the shell. The member 20 may be made from a dielectric material, preferably with piezoelectric properties. Preferably the member 20 is a ceramic and is poled in the d31 mode. Because the member 20 is preferably a piezoelectric material, it has properties of vibrating. The member 20 can also be segmented and circumferentially poled in a $d_{33}$ mode. The member 20 has an opening 22 positioned corresponding to the opening 18 in the shell 16 and extending in the axial direction. Caps 23 are provided at the opposite ends of the shell 16.

An electrically conductive coating 24 is disposed on the inner surface of the member 20. In this way, the shell 16, the coating 24 and the member 20 define a capacitor. An alternating voltage may be applied from a source 26 through leads 28 and 30 to the shell 16 and the coating 24. The alternating voltage produces a flow of current through the capacitor and causes the member 20 and the shell 16 to vibrate. The resonant frequency of such vibrations is dependent upon the mean diameter of the transducer unit 12 and upon the wall thicknesses of the shell 16 and the member 20.

The transducer unit 14 is provided with a conductive shell 30, a dielectric member 32 and a conductive coating 34 in a manner corresponding to the shell 16, the member 20 and the conductive coating 24 in the transducer unit 12. The transducer units 12 and 14 are disposed in abutting relationship with the open ends 18 and 22 respectively in the shell 16 and the member 20 aligned with the corresponding open ends in the shell 30 and the dielectric member 32. The shell 30 and coating 34 have an alternating voltage applied to them from the voltage source 26 in the same phase relationship as the voltages applied to the shell 16 and the coating 24.

The shells 16 and 30 are bonded to each other as at 40 at the positions where they abut each other. The bonding may be as by a weld or a sealant or a rubber boot. Another alternative for the bond 40 may be an aluminum brace with a polyurethane filler or a composite material. The bond 40 braces the transducer units 12 and 14 in a fixed relationship even when the transducer units vibrate.

The transducer units 12 and 14 are effectively connected electrically in parallel and in a synchronous relationship with each other. This causes the capacitance defined in each of the transducer units 12 and 14 to be in parallel with the capacitance in the other transducer unit. Since the electrical current in the transducer assembly 10 is directly related to the value of the capacitance in the transducer assembly, the electrical current is effectively doubled by connecting the transducer units 12 and 14 electrically in parallel.

The effective doubling of the current in the transducer assembly 10 increases the amplitude of the vibrations in the transducer assembly. This increases the effectiveness of the transducer assembly 10 in separating the fluid such as oil from the sedimentation and in recovering the separated oil. In measurements made by applicant on the transducer assembly 10, applicant has found that the transducer assembly 10 is as much as four (4) times as effective as the transducer unit 10 or the transducer unit 12 when the transducer units operate separately. As will be appreciated, this is approximately twice as great as the increase in the value of the capacitances in the transducer units 12 and 14 as a result of the connection of these capacitances in parallel.

The transducer assembly 10 also has other advantages over the prior art. This results from the fact that the lower half of the transducer unit 10 tends to produce vibratory forces in a downward direction and the upper half of the transducer unit 12 tends to produce vibratory forces in an upward direction. These vibratory forces tend to cancel each other. This is particularly true since the downward vibratory forces produced by the lower half of the transducer unit 12 and the upward vibratory forces produced by the upper half of the transducer unit 14 are somewhat limited by the action of the bond 40.

As will be appreciated, vibratory forces are primarily desired in the horizontal direction in FIG. 1 outwardly from the transducer units 10 and 12. Since the vertical components of the vibratory forces in the transducer units 10 and 12 tend to be canceled by the coupling of the transducer units by the bond 40, the result in the transducer assembly 10 is that the vibratory energy in the transducer assembly 10 is primarily outwardly in the horizontal direction. This may explain, at least in part, why the transducer assembly 10 is as much as four (4) times more effective than when the transducer unit 12 or the transducer unit 14 is operated separately.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination, a first unit having a first outer shell made from an electrically conductive material and a member disposed within the first outer shell and made from a dielectric material, there being an electrically conductive material on the inner surface of the first member, the first outer shell and the member being open at one end, a second unit having a second outer shell made from an electrically conductive material and a member disposed with the second outer shell and made from a dielectric material, there being an electrically conductive material on the inner surface of the first member, the second outer shell and the member being open at one end, and means for bracing the first and second units at the open ends of the first and second outer shells.

2. In a combination as set forth in claim 1, means for applying an alternating voltage between the outer shell and the electrically conductive material in each of the first and second units.

3. In a combination as set forth in claim 2, the first and second units being disposed in abutting relationship to each other with the open end of each unit facing the open end of the other unit, the first and second shells being bonded to each other at the positions of their abutting relationships.

4. In a combination as set forth in claim 3, the members within the first and second outer shells being made from a ceramic material, the bonds between the first and second outer shells being formed from a material selected from the group consisting of a weld, a sealant, a rubber boot and a composite material.

5. In combination, first and second units each constructed to vibrate in response to an alternating voltage, means for applying an alternating voltage to the first and second units to obtain a vibration of the units, and means for bracing the units directly to each other to provide the vibrations of each unit in synchronism with the vibrations of the other unit.

6. In a combination as set forth in claim 5, each of the first and second units being constructed to produce vibrations in first and second directions transverse to each other, the bracing means being operative to cancel the effects of the vibrations of the first and second units in the first direction and to reinforce the vibrations of the first and second units in the second direction.

7. In a combination as set forth in claim 5, the first and second units being disposed in abutting relationship to each other and the bracing means retaining the first and second units in a fixed relationship to each other in the abutting relationship.

8. In a combination as set forth in claim 6, the first and second units being disposed in abutting relationship to each other and the bracing means directly retaining the first and second units in a fixed relationship to each other in the abutting relationship, the first direction extending between the first and second units and the second direction extending away from the first and second units.

9. In combination, a first unit constructed to define first and second capacitive plates and to define an electrostatic material between the plates to define a first capacitor and constructed to vibrate upon the introduction of an alternating voltage between the first and second plates, a second unit constructed to define third and fourth capacitive plates and to define an electrostatic material between the plates to define a second capacitor and constructed to vibrate upon the introduction of an alternating voltage between the third and fourth plates, and means for mechanically coupling the first and second units directly to each other to synchronize the vibrations of the first and second units in accordance with the introduction of the alternating voltage to the first and second units.

10. In a combination as set forth in claim 9, each of the first and second units respectively producing an alternating current through the first and second capacitors and the first and second capacitors being connected in parallel to produce a current of increased amplitude through the capacitors and vibrations of an increased intensity through the first and second units in accordance with the flow of current through the capacitors.

11. In combination as set forth in claim 9, the mechanically coupling means being operative to reinforce the first and second units to prevent the first and second units from cracking as a result of the vibrations of the first and second units.

12. In a combination as set forth in claim 9, the mechanically coupling means being operative to reinforce the vibrations of the first and second units in a direction transverse to the direction of the mechanical coupling between the first and second units and to inhibit the vibrations of the first and second units in the direction of the mechanical coupling between the first and second units.

13. In combination:

a first unit constructed to define a first capacitor and to receive an alternating voltage for producing a flow of current through the first unit and to produce vibrations in accordance with the flow of such current, a second unit constructed to define a second capacitor and to receive the alternating voltage for producing a flow of current through the second unit and to produce vibrations in accordance with the flow of such current, and means for coupling the first and second capacitors to obtain a synchronization in the flow of the alternating current through the first and second capacitors as a result of the introduction of the alternating voltage to the first and second capacitors.

14. In a combination as set forth in claim 13, the coupling means being operative to couple the first and second units mechanically and directly to each other to minimize the vibrations of the first and second units in a direction extending between the first and second units.

15. In a combination as set forth in claim 13, means for introducing the alternating voltage synchronously to the first and second capacitors to connect the capacitors in parallel.

16. In a combination as set forth in claim 13, the coupling means being operative to couple the first and second units mechanically to each other to enhance the vibrations of the first and second units in a direction transverse to the direction extending between the first and second units.

17. In combination, a first unit defined by first and second capacitive plates and a dielectric material between the first and second plates to provide a first capacitor and to produce an alternating electrical current through the first capacitor upon the introduction of an alternating voltage between the first and second plates and constructed to produce vibrations upon the flow of the alternating electrical current through the capacitor, a second unit defined by third and fourth capacitive plates and a dielectric material between the third and fourth capacitive plates to provide a second capacitor and to produce an alternating electrical current through the second capacitor upon the introduction of an alternating voltage between the third and fourth capacitive plates and constructed to produce vibrations upon the flow of the alternating electrical current through the second capacitor, and means for connecting the first and second units mechanically to each other to produce a synchronization in the vibrations from the first and second units.

18. In a combination as set forth in claim 17, means for introducing the alternating voltage to the capacitive plates of the first and second units to connect the capacitors in the first and second units in parallel and to facilitate the synchronization in the vibrations from the first and second units.

19. In combination, a first unit defined by first and second capacitive plates and a dielectric material between the first and second plates to provide a first capacitor and to produce an electrical current through the first capacitor upon the introduction of an alternating voltage between the first and second plates and constructed to produce vibrations upon the flow of the current through the first capacitor, a second unit defined by third and fourth capacitive plates and a dielectric material between the third and fourth plates to provide a second capacitor and to produce an electrical current through the second capacitor upon the introduction of an alternating voltage between the third and fourth plates and constructed to produce vibrations upon the flow of the current through the second capacitor, and means for connecting the first and second units mechanically to each other to produce a synchronization in the vibrations from the first and second units, and means for introducing the alternating voltage to the capacitive plates of the first and second units to connect the capacitors in the first and second units in parallel and to facilitate the synchronization in the vibrations from the first and second units, the first and second units being cylindrical and being disposed in abutting relationship and the connecting means bonding the first and second units at the position of the abutting relationship.

20. In a combination as set forth in claim 18, the first and second units being disposed in an abutting relationship in a first direction, each of the first and second units being constructed to vibrate in a first direction and in a second direction transverse to the first direction, the connecting means connecting the first and second units to emphasize the vibrations of the first and second units in the second direction relative to the vibrations of the first and second units in the first direction.

21. In combination, a first unit having an opening at one end, the first unit being defined by a first electrically conductive member having an inner surface and by a first dielectric material abutting the inner surface of the first electrically conductive member and having an inner surface and by a first electrically conductive coating on the inner surface of the first dielectric material, a second unit having an opening at one end, the second unit being defined by a second electrically conductive member having an inner surface and by a second dielectric material abutting the inner surface of the second electrically member and having an inner surface and by a second electrically conductive coating on the inner surface of the second dielectric material, and means for bonding the first and second electrically conductive materials at the openings in the first and second units.

22. In a combination as set forth in claim 21, the first unit having a substantially cylindrical configuration and extending in an axial direction and the opening in the first unit extending axially, the second unit having a substantially cylindrical configuration and extending in an axial direction and the opening in the second unit extending axially, the bonding means extending axially at the openings in the first and second units.

23. In a combination as set forth in claim 21, means for applying an alternating voltage between the electrically conductive member and the electrically conductive coating in each of the first and second units.

24. In a combination as set forth in claim 22, means for applying an alternating voltage between the electrically conductive material and the electrically conductive coating in each of the first and second units, the electrically conductive member in each of the first and second units being metallic, the dielectric material in each of the first and second units being a ceramic, the bonding means being made from a material selected from the group consisting of a weld, a sealant, a composite and a rubber boot.

25. In a combination as set forth in claim 23, the alternating voltage applied between the electrically conductive member and the electrically conductive coating in the first unit being substantially in phase with the alternating voltage applied between the electrically conductive member and the electrically conductive coating in the second unit.

26. In a combination as set forth in claim 23, the first unit having a substantially cylindrical configuration and extending in an axial direction and the opening in the first unit extending axially, the second unit having a substantially cylindrical configuration and extending in an axial direction and the opening in the second unit extending axially, the bonding means extending axially at the openings in the first and second units.

27. In a combination as set forth in claim 24, the alternating voltage applied between the electrically conductive member and the electrically conductive coating in the first unit being substantially in phase with the alternating voltage applied between the electrically conductive member and the electrically conductive coating in the second unit, the first unit having a substantially cylindrical configuration and extending in an axial direction and the opening in the first unit extending axially, the second unit having a substantially cylindrical configuration and extending in an axial direction and the opening in the second unit extending axially, the bonding means extending axially at the openings in the first and second units.

28. In a combination as set forth in claim 2, the alternating voltage applied between the outer shell and the electrically conductive material in the first unit being substantially in phase with the alternating voltage applied between the outer shell and the electrically conductive material in the second unit.

29. In a combination as set forth in claim 17, the first and second units being connected mechanically to each other to inhibit the vibrations of the first and second units in a first direction and to enhance the vibrations of the first and second units in a second direction transverse to the first direction.

30. In combination, a first unit constructed to define first and second capacitive plates and to define a dielectric material between the plates and constructed to vibrate upon the introduction of an energizing voltage between the plates, a second unit constructed to define third and fourth capacitive plates and to define a dielectric material between the plates and constructed to vibrate upon the introduction of an energizing voltage between the plates, means for providing for the introduction of the energizing voltage between the plates of the first and second units, and means for mechanically connecting the first and second units to enhance the vibrations of the units in a first direction, and to inhibit the vibrations of the units in a second direction transverse to the first direction, upon the introduction of the energizing voltage between the plates of the units.

31. In a combination as set forth in claim 30 wherein each of the units is open at a particular position and wherein the units are disposed relative to each other with the openings contiguous to each other in a facing relationship.

32. In a combination as set forth in claim 30 wherein the energizing voltage is alternating and the alternating voltage is applied between the plates of each unit in substantially the same phase as the application of the alternating voltage between the plates of the other unit.

33. In a combination as set forth in claim 30 wherein the first and second units are mechanically connected to define the first direction as a direction away from the units and to define the second direction as a direction between the units.

34. In combination, first and second units each constructed to vibrate in response to an energizing voltage, each of the units being disposed in a closed loop open at one end, the first and second units being disposed in a contiguous relationship with the open ends facing each other, means for mechanically connecting the first and second units at the open ends of the first and second units, and means for applying an energizing voltage to the first and second units at a position displaced from the open ends of the first and second units.

35. In a combination as set forth in claim 34, the voltage means being constructed to provide an alternating voltage and the alternating voltage applied to each of the units being in synchronism with the alternating voltage applied to the other unit.

36. In a combination as set forth in claim 34, each of the first and second units being constructed to produce vibrations in first and second directions, the mechanically connecting means being operative to cancel the effects of the vibrations of the first and second units in the first direction and to reinforce the vibrations of the first and second units in the second direction.

37. In combination as set forth in claim 34, the mechanically connecting units being operative to reinforce the first and second units to prevent the first and second units from cracking as a result of the vibrations of the first and second units.

* * * * *